United States Patent [19]

Kamada

[11] Patent Number: 5,139,351
[45] Date of Patent: Aug. 18, 1992

[54] THERMAL RECORDING APPARATUS HAVING A MOVABLE PLATEN ROLLER

[75] Inventor: Takeshi Kamada, Atsugi, Japan

[73] Assignee: Ricoh Company, Ltd., Tokyo, Japan

[21] Appl. No.: 603,263

[22] Filed: Oct. 23, 1990

Related U.S. Application Data

[63] Continuation of Ser. No. 260,611, Oct. 21, 1988, abandoned.

[30] Foreign Application Priority Data

Oct. 22, 1987 [JP] Japan ............................ 62-160841[U]

[51] Int. Cl.$^5$ .......................... B41J 2/315; H04N 1/21
[52] U.S. Cl. .................................... 400/120; 358/296
[58] Field of Search ................ 400/120, 120 HE, 356, 400/649; 346/76 PH; 358/296, 300, 303

[56]         References Cited
        U.S. PATENT DOCUMENTS

| | | | |
|---|---|---|---|
| 4,480,933 | 11/1984 | Shibayama et al. | 400/120 |
| 4,746,234 | 5/1988 | Harry | 346/76 PH |
| 4,789,903 | 12/1988 | Kamada et al. | 358/296 |
| 4,844,631 | 7/1989 | Feron et al. | 400/649 |
| 4,848,945 | 7/1989 | Sone | 400/649 |

FOREIGN PATENT DOCUMENTS

| | | | |
|---|---|---|---|
| 45180 | 3/1984 | Japan | 400/120 |
| 124877 | 7/1984 | Japan | 400/120 |
| 72761 | 4/1985 | Japan | 400/120 |
| 218146 | 9/1987 | Japan | 400/120 |
| 1435950 | 5/1976 | United Kingdom | 400/120 |

Primary Examiner—David A. Wiecking
Attorney, Agent, or Firm—Oblon, Spivak, McClelland, Maier & Neustadt

[57] ABSTRACT

A thermal recording apparatus for example for use in a facsimile machine includes a thermal printhead provided with a plurality of heat-producing elements arranged in the form of a single array and a platen roller which is pressed against the thermal printhead to keep a sheet of recording paper pressed against the array of heat-producing elements so that a heat pattern defined by the array of heat-producing elements is transferred to the sheet of recording paper efficiently. The platen roller is provided to be movable between a recording position where the platen roller is located separated away from the heat-producing elements so as to allow the sheet of recording paper to be separated away from the heat-producing elements and a stand-by position where the platen roller is located and adjacent to the heat-producing elements to keep the sheet of recording paper pressed against the heat-producing elements. The positioning of the platen roller between the stand-by and recording positions is automatically controlling depending on the mode of operation of the apparatus.

4 Claims, 9 Drawing Sheets

THERMAL RECORDING APPARATUS HAVING A MOVABLE PLATEN ROLLER

This application is a continuation of application Ser. No. 260,611, filed Oct. 21, 1988, now abandoned.

BACKGROUND OF THE INVENTION

1. Field of the Invention

This invention generally relates to a recording apparatus using a thermal printhead and in particular to a thermal recording apparatus having a platen roller which may be moved between operative and inoperative positions depending on the mode of operation of the apparatus.

2. Description of the Prior Art

A thermal recording apparatus, such as a thermal printer, includes a thermal printhead and a platen roller between which a sheet of recording paper, typically heat-sensitive paper, is passed. The thermal printhead is normally provided with a plurality of heat-producing or resistor elements arranged in the form of a single array and the sheet of heat-sensitive paper is transported by the platen roller as pressed against the thermal printhead, in particular, its array of heat-producing elements. Heat pulses are applied to the array of heat-producing elements selectively in accordance with image information to be recorded, and thus the heat-producing elements are selectively activated by the heat pulses to define a heat pattern which in turn is applied to the sheet of heat-sensitive paper. As a result, a color producing layer of the heat-sensitive paper is selectively melted to thereby record an image on the heat-sensitive paper.

However, in such a conventional thermal recording apparatus, since the sheet of heat-sensitive paper is always pressed against the heat-producing elements of the thermal printhead by the platen roller, there is a chance that the heat-sensitive paper becomes stuck to the thermal printhead and/or to the platen roller or undesired recording is effected to the heat-sensitive paper due to residual heat remaining in at least some of the heat-producing elements upon completion of intended recording.

SUMMARY OF THE INVENTION

In accordance with the present invention, there is provided a thermal recording apparatus in which a platen roller is retracted to an inoperative position to thereby have a sheet of recording paper separated away from the heat-producing elements of a thermal printhead upon completion of a recording operation. In this manner, the platen roller is provided to be movable between the operative position where the platen roller keeps the sheet of recording paper, typically heat-sensitive paper, pressed against the heat-producing elements of the thermal printhead and the inoperative position where the platen roller allows the sheet of recording paper to be separated away from the heat-producing elements. The platen roller is located at its operative position while the recording apparatus is in a recording mode of operation and at its inoperative position upon completion of the recording operation.

It is therefore a primary object of the present invention to obviate the disadvantages of the prior art as described above and to provide an improved thermal recording apparatus.

Another object of the present invention is to provide an improved thermal recording apparatus capable of preventing a sheet of recording paper from being stuck to the thermal printhead and/or the platen roller.

A further object of the present invention is to provide an improved thermal recording apparatus capable of preventing undesired recording from being made on a sheet of recording paper after completion of intended recording.

A still further object of the present invention is to provide an improved thermal recording apparatus including a shiftable platen roller which may be automatically moved between operative and inoperative positions depending on the operating status of the apparatus.

Other objects, advantages and novel features of the present invention will become apparent from the following detailed description of the invention when considered in conjunction with the accompanying drawings.

DESCRIPTION OF THE PREFERRED EMBODIMENTS

Figure 1:
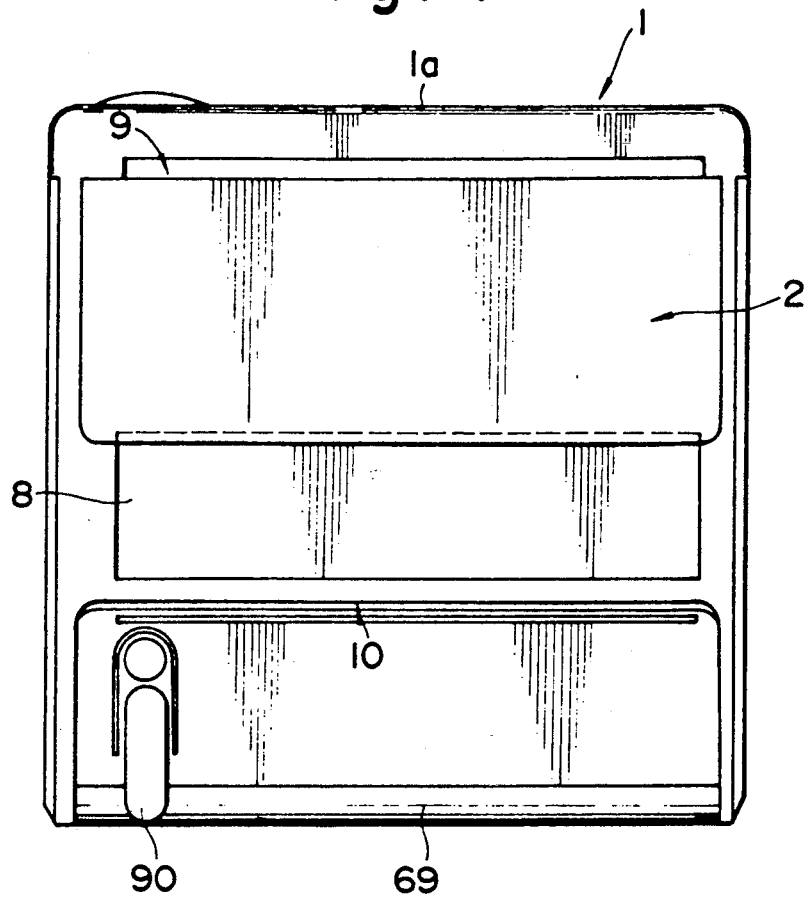
FIG. 1 is a schematic illustration showing in plan view a facsimile machine constructed in accordance with one embodiment of the present invention.
Figure 2:
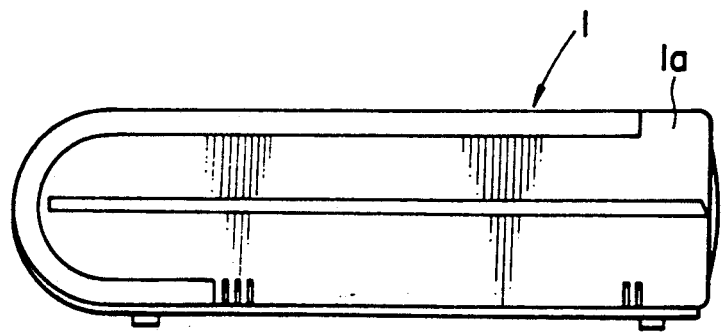
FIG. 2 is a schematic illustration showing in side elevation the present facsimile machine.
Figure 3:
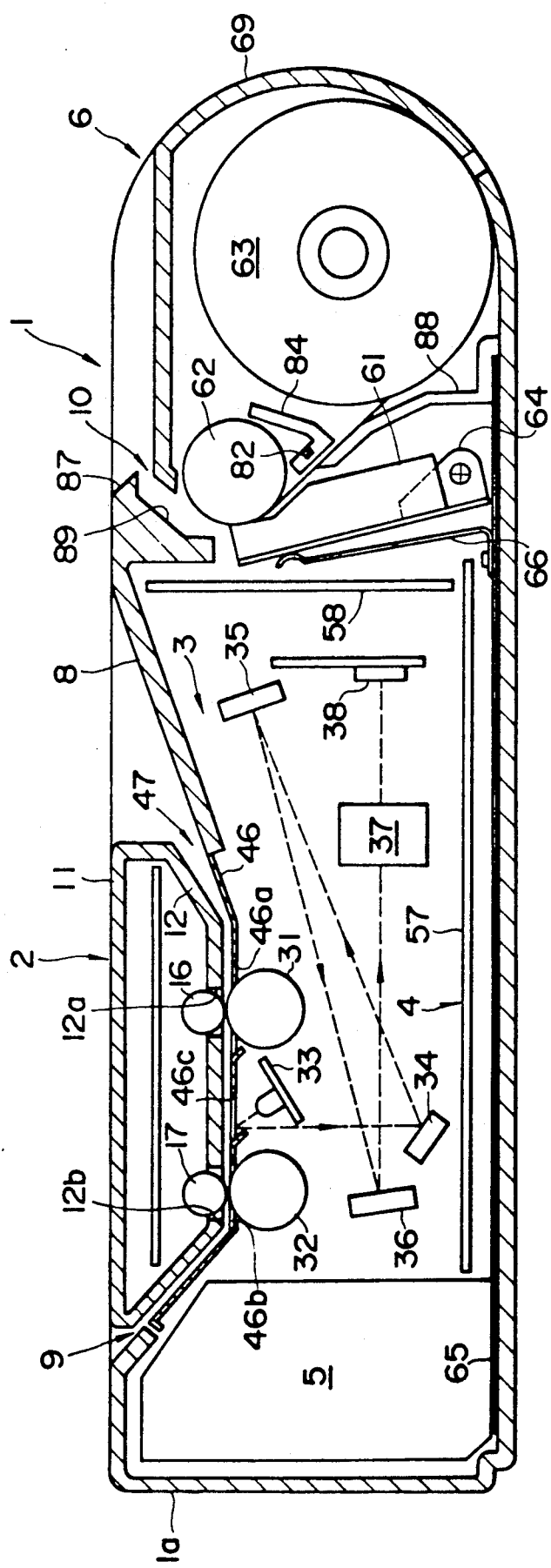
FIG. 3 is a schematic illustration showing in cross section the internal structure of the present facsimile machine.
Figure 4:
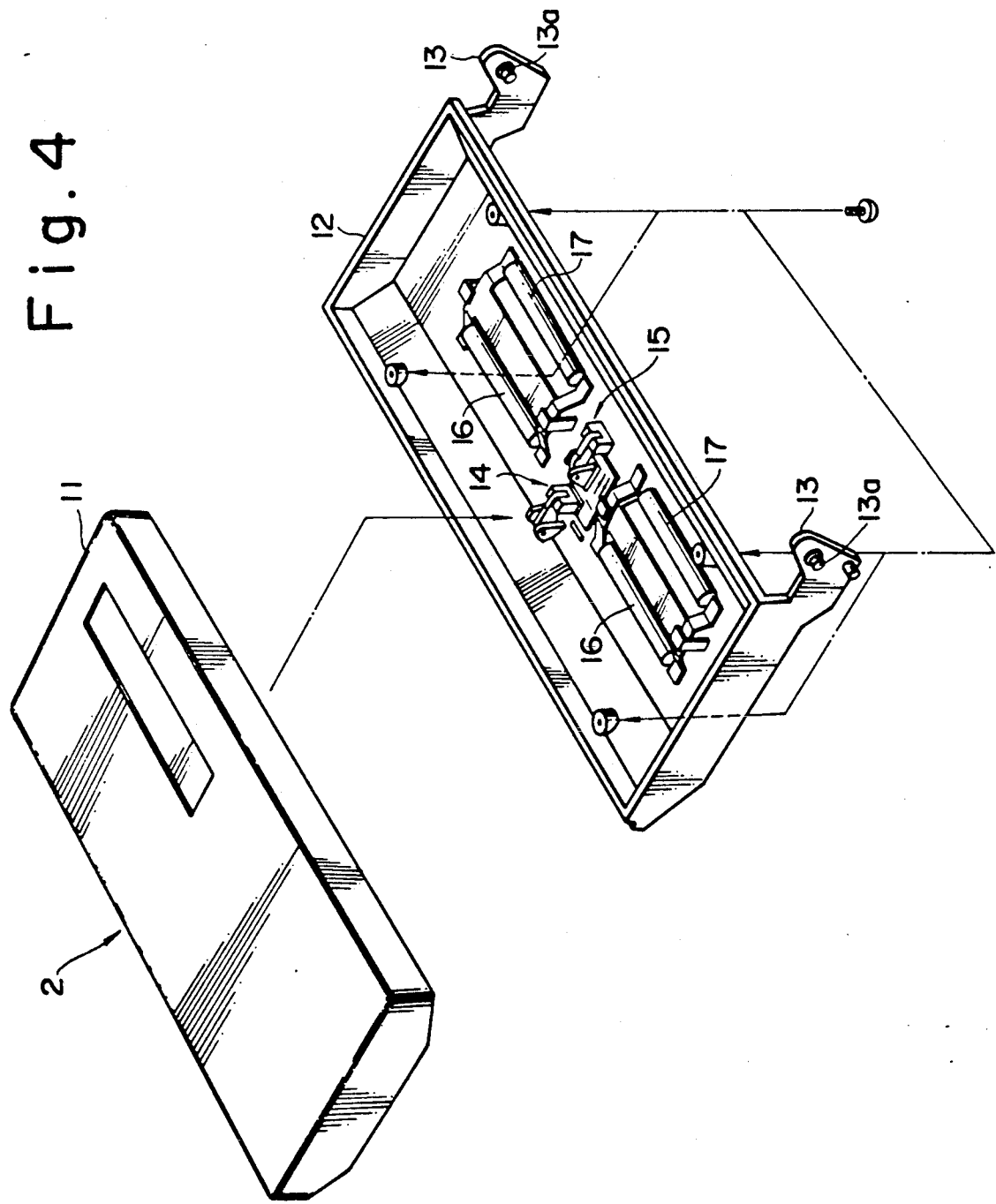
FIG. 4 is a schematic illustration showing in exploded, perspective view the operation unit of the present facsimile machine.

Referring first to FIGS. 1 through 3, there is schematically shown a facsimile machine 1 constructed in accordance with one embodiment of the present invention. As shown, the facsimile machine 1 includes a main body 1a, an operation unit 2, an original reading unit 3, a control unit 4, a power supply unit 5, a recording unit 6, a drive unit 7 (FIG. 7), an original insertion slot 8, an original discharge slot 9 and a recording paper discharge slot 10. As shown in FIG. 4, the operation unit 2 includes a pair of upper and lower covers 11, 12, for example, comprised of a resin or the like, and the upper cover 11 is provided with a plurality of switches (not shown) necessary for various operations. The lower cover 12 is integrally formed with a pair of holding members 13 on both sides, and each of the holding members 13 is formed with a projection 13a which projects in a predetermined direction. The operation unit 2 is pivotally supported by the projections 13a of the holding members 13 located between a pair of side frames 39 which will be described in detail later.

Figure 5:
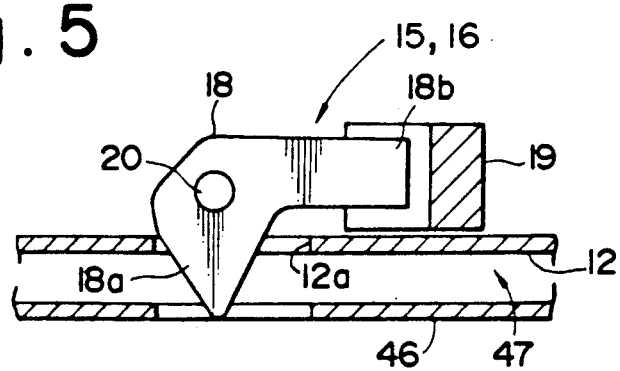
FIG. 5 is a schematic illustration showing an original sensor provided in the operation unit shown in FIG. 4.

The lower cover 12 is provided with original sensors 14 and 15 and with transportation rollers 16 and 17, and the original sensors 14 and 15 are disposed at the center of the operation unit 2 and arranged in a line in a direction of transportation of an original spaced apart from each other over a reading surface which will be described later. That is, the original sensor 14 detects the insertion of an original by detecting the leading edge thereof, and the original sensor 15 detects the arrival of the original by detecting the leading edge thereof and the completion of transportation of the original by detecting the trailing edge thereof. Each of the original sensors is comprised, for example as shown in FIG. 5, of an actuator 18 and a transmission type photo-coupler 19, and the actuator 18 is supported to be pivotal around a shaft 20. The actuator 18 includes a detector portion 18a and a light-shielding portion 18b, and the detector portion 18a projects into an original transportation path. That is, the actuator 18 has its center of gravity in the detector portion 18a which normally projects into the original transportation path 47 to shield the light of the transmission type photo-coupler 19, as shown in FIG. 5. When an original is supplied, the actuator 18 pivots with its detector portion 18a pushed by the travelling original, so that the light-shielding portion 18b moves out of the optical path of the transmission type photo-coupler 19 and thus the photo-coupler 19 is set in its on condition.

On the other hand, the transportation rollers 16 and 17 are rotatably supported and located spaced apart from each other over the reading surface, and the transportation rollers 16 and 17 are arranged on both sides of the original sensors 14 and 15. The transportation rollers 16 and 17 partly project through respective openings 12a and 12b formed in the lower cover 12, and the transportation rollers 16 and 17 are in contact with later-described transportation rollers 31 and 32 of the original reading unit 3.

Figure 6:
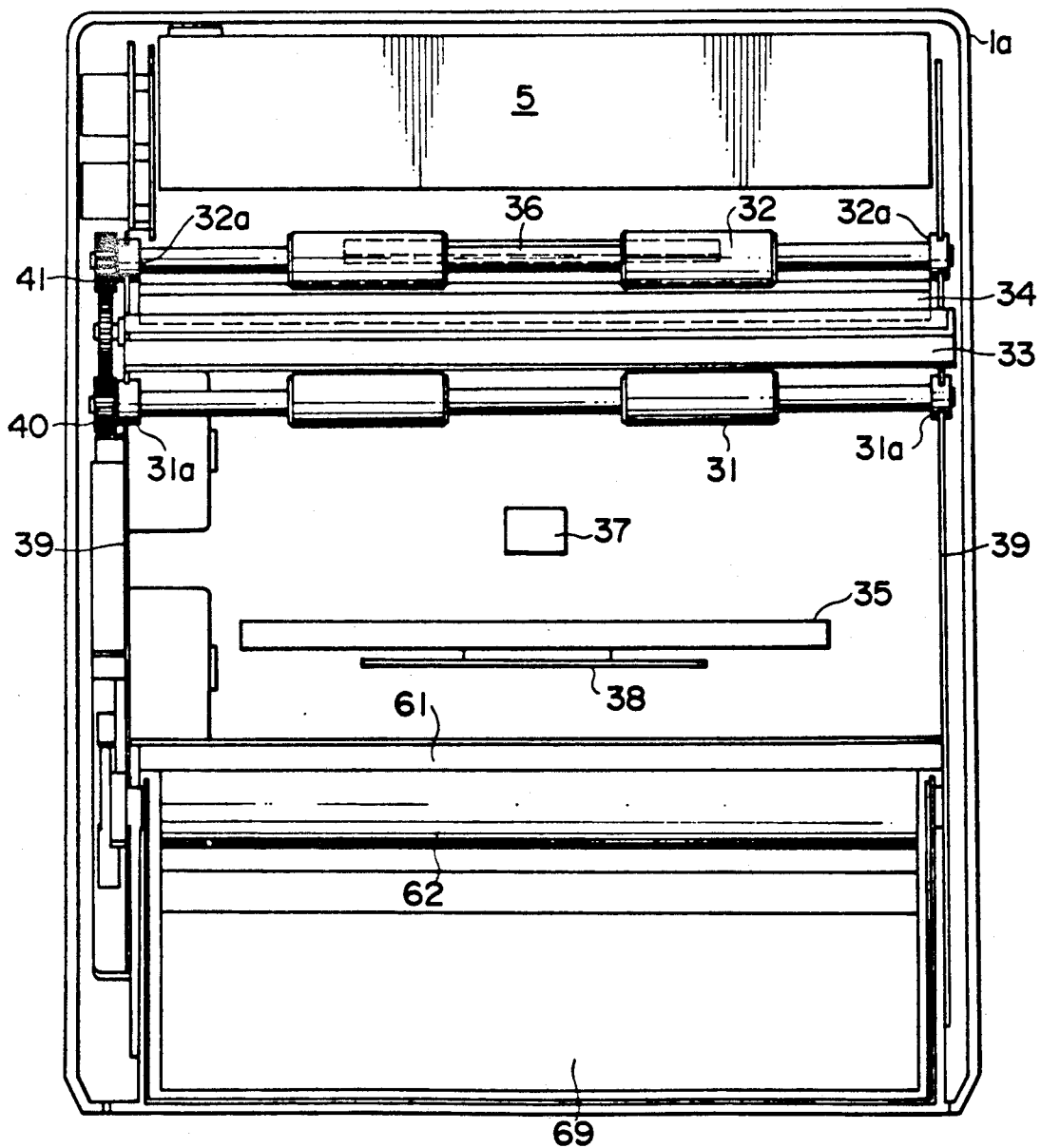
FIG. 6 is a schematic illustration showing in plan view the internal main portion of the present facsimile machine.

The original reading unit 3 includes the transportation rollers 31 and 32, a light source 33, mirrors 34, 35 and 36, a lens 37 and a line image sensor 38. The transportation rollers 31 and 32 extend between a pair of side frames 39 as shown in FIG. 6, and these transportation rollers 31 and 32 are rotatably supported by the side frame 39 through bushes 31a and 32a provided on both ends of the transportation rollers 31 and 32. The transportation rollers 31 and 32 are provided with roller gears 40 and 41 at their one ends, and the transportation rollers 31 and 32 rotate by receiving power transmitted thereto through the roller gears 40 and 41 to thereby transport the original at a predetermined speed.

Figure 7:
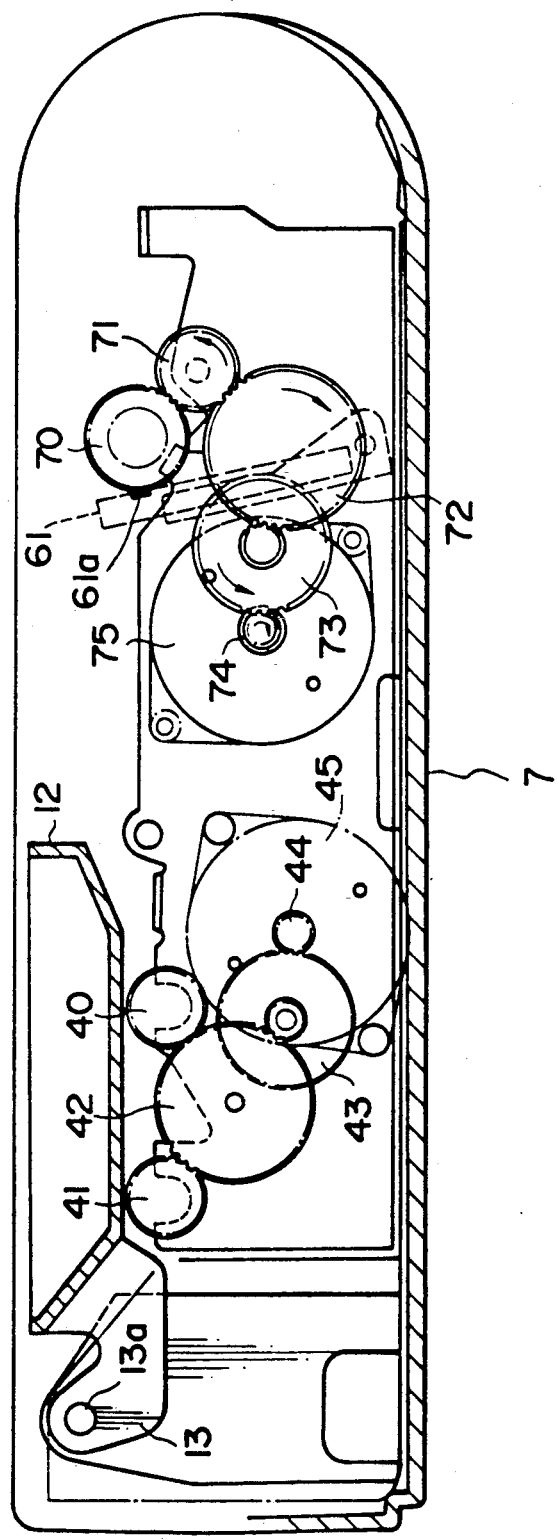
FIG. 7 is a schematic illustration showing a mechanical drive system of the present facsimile machine.

As shown in FIG. 7, the roller gears 40 and 41 are in mesh with an idle gear 42 which in turn is in mesh with an intermediate gear 43. The intermediate gear 43 is a two-stage gear and in mesh with a pinion gear 44. The pinion gear 44 is fixedly attached to a shaft of a stepping motor 45 which is driven by a drive signal supplied from the control unit 4. Thus, the transportation rollers 31 and 32 are driven to rotate with the transmission of rotational force from the stepping motor 45 through the pinion gear 44, intermediate gear 43, idle gear 42 and roller gears 40 and 41. And, the transportation speed of the original at this time is set based on the timing of reading of one line by a line image sensor 38. The transportation roller 31 is disposed somewhat rearwardly (toward the original discharge slot 9) of the original sensor 14 mounted on the lower cover 12, and the transportation roller 32 is also provided to be somewhat rearwardly of the original sensor 15. For this reason, setting of an original into the original insertion slot 8 can be determined securely, and the reading unit may be set inoperative upon passing of the trailing edge of the original past the original sensor 15 upon completion of reading of one frame of the original. With this structure, the trailing portion of the original may be held by the transportation rollers 17 and 32, and thus, the original may be prevented from falling down upon completion of reading when the facsimile machine 1 is used as hung on a wall. The original which is being held by the transportation rollers 17 and 32 is discharged, for example, when the facsimile machine 1 transmits the next original or when a feed switch (not shown) provided on the operation unit 2 is depressed. The transportation rollers 31 and 32 partly project through the openings 46a and 46b formed in a guide plate 46 and are in contact with the respective transportation rollers 16 and 17. The guide plate 46 is made of sheet metal or the like, and the guide plate 46, together with the lower cover 12 of the operation unit 2, defines the original transportation path 47 to thereby lead the original set in the original insertion slot 8 toward the original discharge slot 9.

Returning to FIG. 3, the light source 33 is, for example, comprised of a light-emitting diode array and irradiates light across the widthwise direction of the original through an opening 46c formed in the guide plate 46. The opening 46c indicates the so-called original reading position and it is located between the transportation rollers 31 and 32. The light emitted from the light source 33 is reflected by the surface of the original and then introduced into the lens 37 by means of mirrors 34, 35 and 36. The lens 37 causes the light thus received to be scaled down at a predetermined ratio to form an image on the light-receiving elements of the line image sensor 38. As one example, the line image sensor 38 is comprised of a charge coupled device (CCD), and a plurality of light-receiving (photoelectric) elements are arranged at a predetermined pitch extending in the reading direction. The line image sensor 38 causes the light signal impinging upon the light-receiving elements to be converted into an electrical signal which is then supplied to the control unit 4.

Figure 8:
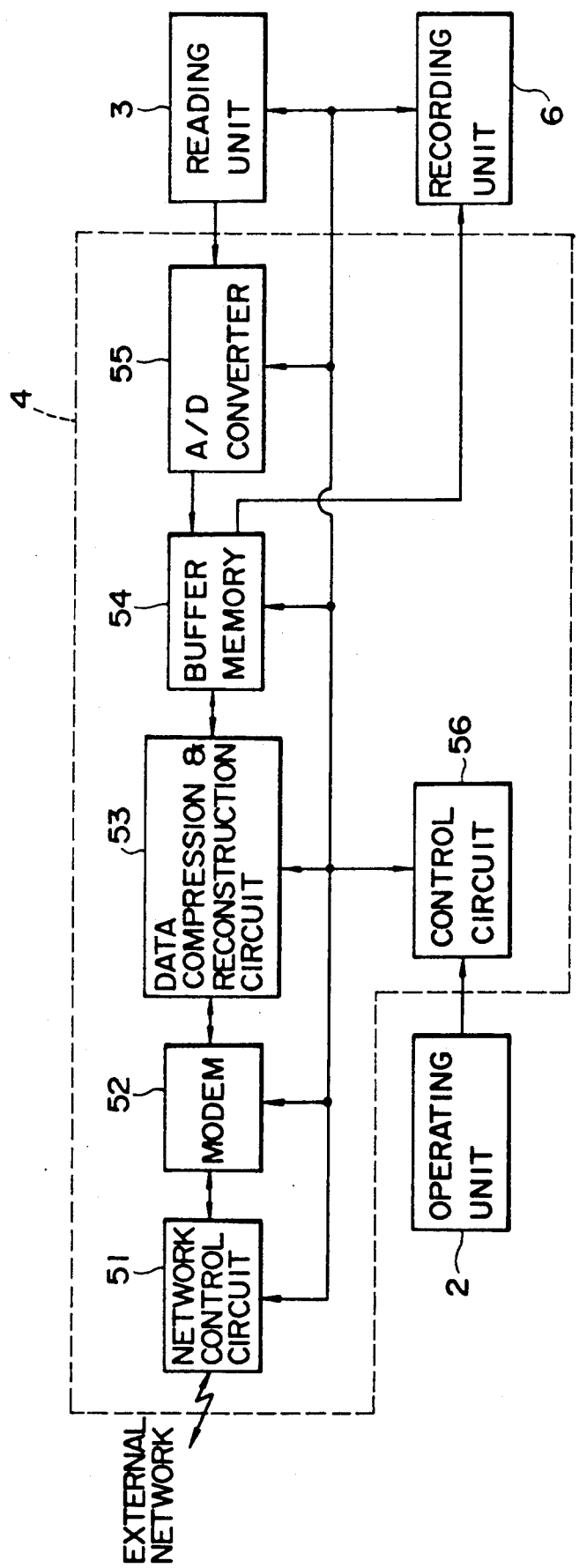
FIG. 8 is a block diagram showing the overall structure of a control system of the present facsimile machine.

As shown in FIG. 8, the control unit 4 includes a network control unit 51, a modem 52, a data compression and reconstruction circuit 53, a buffer memory 54, an A/D converter 55 and a control circuit 56. The network control unit 51 is generally referred to as "AA-NCU", which has a function placing a call to a destination automatically and receiving a call from a transmitter at a remote location automatically. The modem 52 modulates the image information of an original which has been processed inside of the control unit 4 and digitized for transmission through an external transmission line and demodulates the signal transmitted through the external transmission line to thereby extract a corresponding digital signal. The data compression and reconstruction circuit 53 has a purpose of shortening the transmission time of image information, so that during transmission, it compresses image information by coding and during reception, it reconstructs the original image information from the compressed image information by decompression. The buffer memory 54 stores the image information from the line image sensor 38 which has been binary-valued by the A/D converter 55 line by line and outputs it to the recording unit 6. The A/D converter 55 converts one line of image information (analog signal) from the line image sensor 38 into image information (digital signal) which may be processed by the control unit 4. The control circuit 56 is provided with a CPU, a ROM and a RAM, and it systematically controls the overall facsimile machine 1 based on a command signal from the operation unit 2 and also the image information transmitted through the external transmission line. The control unit 4 is formed on substrates 57 and 58 as divided.

Figure 12:
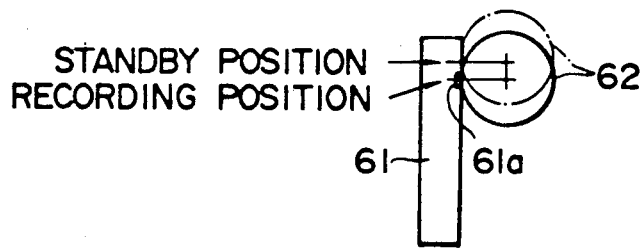
FIG. 12 is a schematic illustration showing the positional relationship between the platen roller and the thermal printhead of the present facsimile machine.

Again returning to FIG. 3, the power supply unit 5 is, for example, comprised of a stabilized power supply and supplies power to various components of the facsimile machine 1. The recording unit 6 includes a thermal printhead 61, a platen roller 62 and a roll of recording paper 63. The thermal printhead 61 is provided with a plurality of heat-producing elements 61a (one being shown in FIG. 12) spaced apart at a predetermined pitch in the form of a single array extending across the widthwise direction of the recording paper 63. In accordance with image information supplied from the control unit 4, the plurality of heat-producing elements of the thermal printhead 61 are selectively activated to form a heat pattern which is applied to the recording paper 63 located between the printhead 61 and the platen roller 62 to thereby carry out recording line by line. The thermal printhead 61 is mounted on a bracket 64 which has its bottom portion pivotally connected to a base frame 65. Of course, the thermal printhead 61 is maintained in a position such that the heat-producing elements 61a provided in the thermal printhead 61 are in pressure contact with the platen roller 62. On the other hand, behind the bracket 64 is disposed a leaf spring 66 which has its base end portion fixedly attached to the base frame 65 and its free end portion in contact with the bracket 64, so that the leaf spring 66 exerts a pressing force to the bracket 64 to secure a pressure contact between the heat-producing elements 61a and the platen roller 62. The platen roller 62 is, for example, comprised of a metal rod and a rubber layer formed on the rod, and the platen roller 62 has a role of providing an enhanced contact between the heat-producing elements 61a and the recording paper 63 thereby providing a recorded image high in quality.

Figure 9:
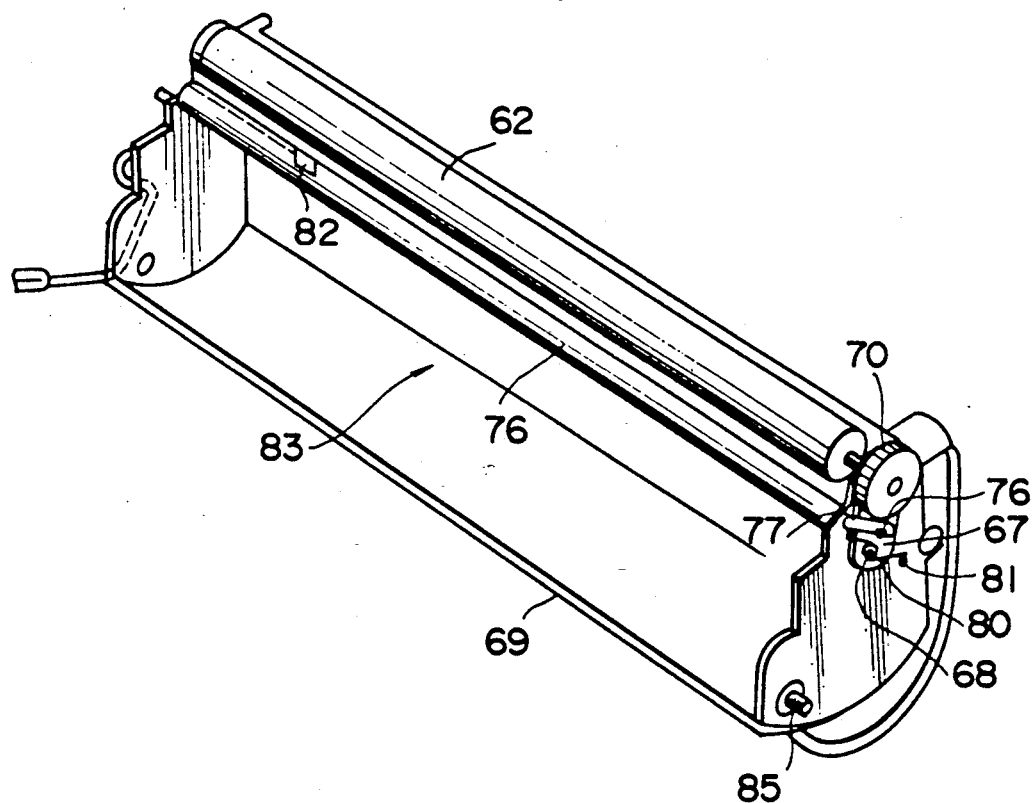
FIG. 9 is a schematic illustration showing in perspective the overall structure of a recording paper cover unit of the present facsimile machine.
Figure 10:
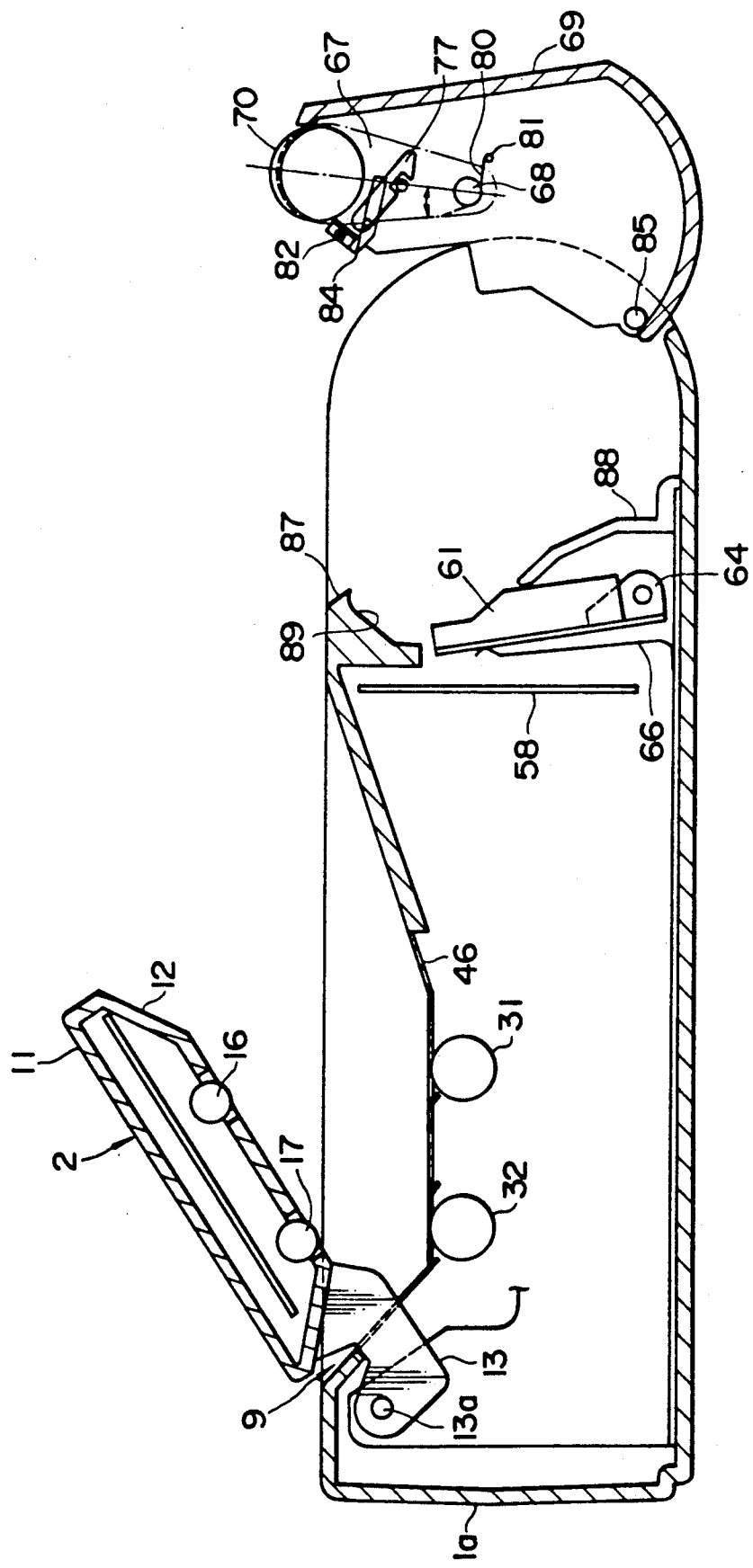
FIG. 10 is a schematic illustration showing the present facsimile machine with its operation unit and recording paper cover unit located at open positions.

As shown in FIGS. 9 and 10, the platen roller 62 has both ends rotatably supported by the support members 67 which are rockingly supported by a recording paper cover unit 69, constituting a second support member, through a shaft 68. A platen gear 70 is fixedly attached to one end of the platen roller 62 and the platen gear 70 is in mesh with a coupling gear 71 which in turn is in mesh with a drive gear 72 as shown in FIG. 7. The drive gear 72 is operatively coupled to a pinion gear 74 through an intermediate gear, which is a two-stage gear, and the pinion gear 74 is fixedly attached to the shaft of the stepping motor 75. Thus, when the pinion gear 74 rotates clockwise as indicated by the arrow in FIG. 7 by the stepping motor 75, the intermediate gear 73 and the drive gear 72 rotate as indicated by the arrows to cause the coupling gear 71 to rotate counterclockwise. Due to the counterclockwise rotation of the coupling gear 71, the platen gear 70 rotates clockwise to have the platen roller 62 driven to rotate clockwise. Through the rotation of the platen roller 62, the recording paper 63 is transported toward the recording paper discharge slot 10.

It is to be noted that the coupling gear 71 is in mesh with the platen gear 70 at a location slightly lower than a hypothetical line connecting the shaft 68 and the center of the platen gear 70 (in the direction opposite to the opening direction of the support member 67) so as to secure smooth opening and closing operations of the recording paper cover unit 69.

Figure 11A:
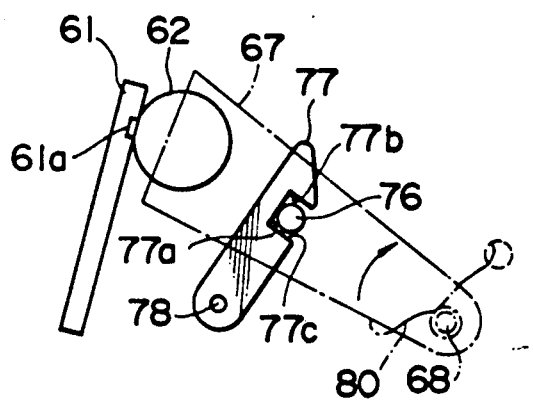
FIGS. 11a and 11b are schematic illustrations showing a platen roller support member and a lock mechanism of the present facsimile machine.
Figure 11B:
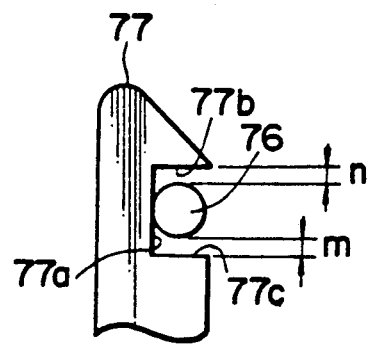

The support member 67 is formed with a lock pin 76 at a location on a hypothetical straight line connecting the centers of the shaft 68 and the platen roller 62. As schematically shown in FIG. 11a, the lock pin 76 is in engagement with a cut-away portion 77a of a lock lever 77 which is pivotally mounted on the recording paper cover unit 69 through a shaft 78. The cut-away portion 77a of the lock lever 77 is so formed that its length in the longitudinal direction of the lock lever 77 is longer than the diameter of the lock pin 76 as shown in FIG. 11b. The cut-away portion 77a of the lock lever 77 is defined with an upper stopper portion 77b and a lower stopper portion 77c for limiting the movement of the lock lever 77 by the upper and lower sides of the cut-away portion 77a. The upper and lower stopper portions 77b and 77c are spaced apart from the lock pin 76 over distances n and m, respectively. Thus, the lock pin 76 and the lock lever 77 define a lock mechanism which locks the support member 67 in a position to be in contact with the thermal printhead 61 when the recording paper cover unit 69 is closed. When locked by the lock mechanism 79, the support member 67 may pivot around the shaft 68 over an angle corresponding to a predetermined distance (n+m). As shown in FIGS. 9 and 11a, the support member 67 is urged to rotate clockwise by the coil spring (stand-by means) 80 in the direction indicated by the arrow, and the coil spring 80 is wound around the shaft 68 and has its end engaged with the support member 67 and its other end inserted into a hole 81 formed in the recording paper cover unit 69 to be in engagement with the recording paper cover unit 69. Thus, when locked by the lock mechanism 79, the support member 67 receives a force tending to rotate in the clockwise direction, so that the lock pin 76 is brought into contact with the upper stopper portion 77b.

The platen gear 70, coupling gear 71, drive gear 72, intermediate gear 73, pinion gear 74 and stepping motor 75 define a recording position set means 100 which moves the platen roller 62 to a recording position to receive heat from the heat-producing elements 61a during recording mode, of operation.

The recording paper 63 is heat-sensitive paper originally in the form of a roll which is stored inside the recording paper cover unit 69. The recording paper 63 is provided with an end mark, such as a black region, at the end of the roll, so that this end mark may be detected by a paper end sensor 82 shown in FIG. 9 to detect the end of the recording paper 63. In FIG. 9, the recording paper cover unit 69 is, for example, comprised of a resin or the like, and as described before, it supports the platen roller 62 through the support members 67 and stores the recording paper 63 inside its storing section 83. A paper guide 84 is formed inside the recording paper cover unit 69, and the paper guide 84 keeps the recording paper 63 separated away from the platen roller 62 and holds the paper end sensor 82 in the transportation path for the recording paper 63. The recording cover unit 69 is formed with a projection 85 one at each end, and the recording paper cover unit 69 is pivotally supported by the side frames 39 through these projections 85.

The paper end sensor 82 is comprised, for example, of a photo-reflector, and it detects the end mark provided at the trailing end of the recording paper 63 and outputs a detection signal to the control unit 4. On the other hand, as shown in FIG. 3, in the vicinity of the recording paper discharge slot 10 is provided a cutter 87 integrally formed with the main body 1a, and the cutter 87 cuts the recording paper 63 discharged out of the recording paper discharge slot 10 to a desired length. The main body 1a is formed with paper guides 88 and 89, and the paper guide 88 protects the thermal printhead 61 and guides the recording paper 63 toward the contact point between the thermal printhead 61 and the platen roller 62. The paper guide 89 guides the recording paper 63 toward the recording paper discharge slot 10. That is, the paper guides 84, 88 and 89 together define a portion of the recording paper transportation path. On the other hand, the recording paper cover unit 69 is provided with a lock button 90 as shown in FIG. 1, and the lock button 90 controls the locking and unlocking operation between the recording paper cover unit 69 and the main body 1a.

In operation, when transmitting the image information of an original to a receiver at a remote station, the original is inserted into the original insertion slot 8 until its leading edge comes into abutment against the contact line between the transportation rollers 16 and 31, the original sensor 14 is turned on and thus original set information is input into the control unit 4. Various control signals are output from the control unit 4 to various components, and in accordance with these various control signals, the light source 33 is activated and the stepping motor 45 is activated to drive the transportation rollers 31 and 32. Thus, the original with its leading edge in abutment against the contact line between the transportation rollers 16 and 31 begins to be transported toward the original discharging slot 9 at a predetermined speed. Then, after detecting the passage of the original past the original sensor 15, the original is further transported over a predetermined amount and is caused to stop at a time when the leading edge has been led into the reading unit. Thereafter, when the original is transported, the image information of the original is read by the line image sensor 38 line by line and the original image thus optically read is subjected to photoelectric conversion to thereby produce electrical image information which is then supplied to the control unit 4. The image information thus supplied into the control unit 4 is processed in a predetermined procedure and transmitted to the receiver at a remote station.

On the other hand, as the transportation of the original progresses, when the trailing end of the original moves past the original sensor 15 to turn the original sensor 15 off, the stepping motor 45 is stopped to thereby stop the transportation rollers 31 and 32 and at the same time the light source 33 is deactivated. For this reason, the original comes to be maintained with its trailing edge sandwiched between the transportation rollers 17 and 32. Thus, for example, even if the facsimile machine 1 is used in a vertical orientation as hanging on a wall, the original is prevented from falling off upon completion of reading of the original. When the facsimile machine 1 receives image information transmitted from a transmitter at a remote place through an external transmission line, it is processed in a predetermined procedure and supplied to the recording unit 6 to have it recorded.

A recording operation at the recording unit 6 is carried out such that heat pulses are supplied to the thermal printhead 61 in accordance with an image signal to be recorded with the recording paper 63 transported toward the recording paper discharge slot 10 as sandwiched between the platen roller 62 and the thermal printhead 61. As a procedure of this recording operation, a drive signal is first supplied from the control unit 4 to the stepping motor 75 to thereby have the recording paper 63 transported over a predetermined amount and also have the platen roller 62 moved over a predetermined amount in the transportation direction to be set in position at a recording position (operative position) shown in FIG. 12. That is, the platen roller 62 is supported by the support members 67 which are pivotally supported by the recording paper cover unit 69 through the shaft 68 and also urged clockwise by the coil spring 80 as shown in FIG. 11a. Thus, the support member is set in its stand-by position (inoperative position) indicated by the one-dotted line in FIG. 12 by the coil spring 80 during non-recording mode, and this stand-by position is defined as a position when the lock pin 76 is in engagement with the upper stopper portion 77b of the lock lever 77.

Figure 13:
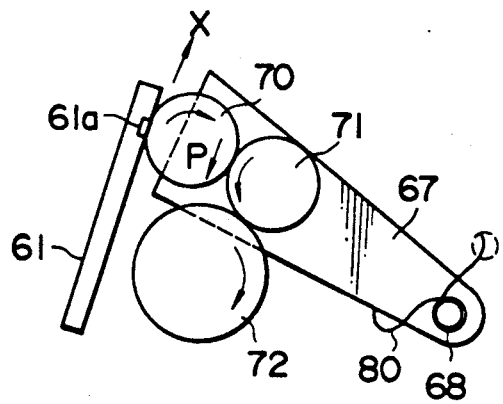
FIG. 13 is a schematic illustration which is useful for understanding the mechanism of shifting of position of the platen roller in the present facsimile machine.

During recording, when the stepping motor 75 is driven in order to obtain a proper alignment of contact position between the heat-producing elements and the platen roller 62, the stepping motor 75 rotates the pinion gear 74 clockwise as shown in FIG. 7, and the rotation of the pinion gear 74 causes the intermediate gear 73 to rotate counterclockwise, the drive gear 72 to rotate clockwise and the coupling gear 71 to rotate counterclockwise. When the coupling gear 71 rotates counterclockwise, the platen gear 70 receives a force P in the direction opposite to the direction of transportation of the recording paper 63, which is indicated by X in FIG. 13, from the coupling gear 71. And, the support member 67 pivots counterclockwise by this force P, so that the lock pin 76 comes into abutment against the lower stopper portion 77c and is maintained at its position (recording position). As a result, at the time of recording, prior to recording, the platen roller 62 moves away from the stand-by position and comes to be located at its recording position.

As described above, when the platen roller 62 is set at its recording position, heat pulses are selectively supplied to the heat-producing elements 61a of the thermal printhead 61 in accordance with image information to be recorded so that the heat-producing elements 61a are selectively activated to define a heat pattern which is applied to the recording paper 63. Thus, the color-producing layer of the recording paper 63 is selectively melted to produce heat in the form of the heat pattern applied thereto by the thermal printhead 61. Recording by the thermal printhead 61 to the recording paper 63 is carried out line by line, during which the stepping motor 75 is continuously driven to rotate each of the gears 70 through 74 and hold the platen roller 62 at its recording position. Therefore, during recording, the recording unit 6 is set at its recording position with the lock pin 76 in abutment against the lower stopper portion 77c, so that the possible occurrence of blurring in recording is prevented and a recorded image of high quality is provided.

Upon completion of recording of all of the image information, the stepping motor 75 is brought to a halt after it has been driven sufficiently to move the trailing end of the recorded image past the cutter 87. When the stepping motor 75 has been brought to a halt, the force P which has been applied to the platen gear 70 by the coupling gear 71 disappears and the support member 67 is pivoted clockwise under the force of the coil spring 80. Thus, the platen roller 62 moves from the recording position to the stand-by position shown in FIG. 12 so that the recording paper 63 is separated away from the heat-producing elements 61a of the thermal printhead 61. As a result, upon completion of recording, the recording paper 63 is prevented from receiving residual heat from the heat-producing elements 61a undesirably, so that the recording paper 63 is prevented from being stuck to the heat-producing elements 61a and undesired recording from being effected to the recording paper due to the residual heat of the heat-producing elements 61a. During stand-by mode, since the platen roller 62 is shifted toward the tip end of the thermal printhead 61, the force applied by the leaf spring 66 under the condition is less than that during recording mode, and, thus, the platen roller 62 is prevented from being modified in shape even if the non-recording mode continues for a long period of time.

The recording paper 63 to which recording has been effected is discharged onto the top of the main body 1a through the recording paper discharge slot formed between the main body 1a and the recording paper cover unit 69 and the recording paper 63 is cut to a desired size by the cutter 87.

Figure 14:
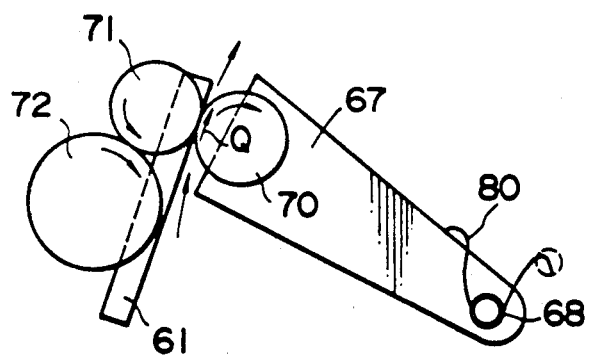
FIGS. 14 and 15 are schematic illustrations showing an alternative embodiment of the present invention.
Figure 15:
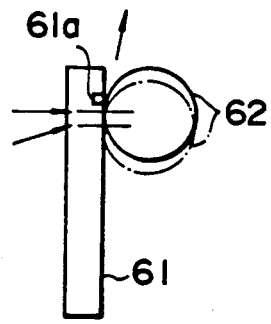

In the above-described embodiment, through the rotation of the coupling gear 71, the platen gear 70 receives force P in the direction opposite to the direction of transportation of the recording paper 63 and, upon completion of recording, the platen roller 62 is moved in the direction of transportation of the recording paper 63 to be located at the stand-by position. However, the present invention should not be limited only to this specific embodiment, it may also be structured such that the platen roller 62 is moved in the direction of transportation of the recording paper 63 at the time of recording and moved in the direction opposite to the direction of transportation of the recording paper 63 upon completion of recording, as shown in FIGS. 14 and 15. In the latter case, the coil spring 80 is provided such that it urges the support member 67 to pivot counterclockwise, and the coupling gear 71 is provided to be in mesh with the platen gear 70 at a location opposite to the shaft 68 with respect to the center axis of the platen gear 70. With this arrangement, when the coupling gear 71 rotates counterclockwise, a force Q is applied to the platen gear 70 as shown in FIG. 14. Thus, during non-recording mode, the platen roller 62 is set at its stand-by position shown in FIG. 15 as it is urged to pivot counterclockwise by the coil spring 80; whereas, during recording, the platen roller 62 is shifted from its stand-by position to its recording position by the force Q to carry out a recording operation. Upon completion of recording, the force Q disappears and thus the platen roller 62 moves from its recording position to its stand-by position under the force of the coil spring 80. Accordingly, similarly with the above-described embodiment, the recording paper 63 is prevented from being stuck to the heat-producing elements 61a and undesired recording is prevented from being effected due to any residual heat in the heat-producing elements 61a. Furthermore, in this case, when the platen roller 62 moves from its recording position to its stand-by position, since the platen roller 62 does not move over the heat-producing elements 61a, there is even less likelihood of bringing about such disadvantages as noted above. This is because, in practice, during recording mode, the platen roller 62 is not located immediately above the heat-producing elements 61a, but instead it is located slightly toward the upstream side of the heat-producing elements 61a with respect to the direction of transportation of the recording paper 63. Incidentally, when the projection 85 and the shaft 68 are replaced by a common element and thus the lock mechanism 79 around the platen roller 62 is commonly used as a lock mechanism for locking the recording paper cover unit 69 to the main body 1a (in this case, the lock lever 77 should be mounted on the main body 1a), the number of parts can be reduced and the manufacturing cost can be lowered.

It should also be noted that the present invention has been described when applied to facsimile machines; however, the present invention should not be limited only to such applications and the present invention may be applied to any other apparatuses as long as they are of the thermal recording type.

As described above, in accordance with the present invention, upon completion of recording, the platen roller is moved away from its operative or recording position to its inoperative or stand-by position automatically to thereby have recording paper temporarily separated away from heat-producing elements of a thermal printhead, so that various disadvantages, such as sticking of recording paper to the heat-producing elements or undesired recording due to any residual heat in the heat-producing elements, can be effectively prevented from occurring.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A thermal recording apparatus comprising:
   a thermal printhead provided with a plurality of heat-producing elements;
   a platen roller which is driven to rotate to cause a sheet of recording paper sandwiched between said thermal printhead and said platen roller to be transported;
   supporting means for rotatably supporting said platen roller, said supporting means comprising a support member which is movable between first and second positions to locate said platen roller between a stand-by position where said platen roller is located separated away form said heat-producing elements and a recording position where said platen roller is located adjacent to said heat-producing elements; and position control means for controlling the position of said supporting means, said position control means positioning said supporting means at said first position during a non-recording mode and at said second position during a recording mode;

wherein said position control means comprises spring means for selectively biasing said support member toward one of said first and second positions and gear means for selectively urging said support member against said spring biasing toward the other of said first and second positions, and wherein said position control means includes a lock lever formed with a cut-away portion and a pin fixedly attached to said support member and in engagement with said cut-away portion of said lever, said lock lever being pivotally supported and said cut-away portion having a first engagement portion which is engaged by said pin when said supporting means takes said first position and a second engagement portion which is engaged by said pin when said supporting means takes said second position;

wherein said gear means comprises a platen gear attached to one end of said platen roller, said platen gear being in mesh with a coupling gear which cooperates with a drive gear, such that when the stand-by position is located rearwardly of the recording position with respect to the thermal printhead, the coupling gear in mesh with the platen gear is meshed at a side which is opposite to a side where the platen is in contact with the thermal printhead to rotate the platen clockwise and the support member is urged toward the stand-by position by the spring means, and when the stand-by position is located forward of the recording position with respect to the thermal printhead, the coupling gear in mesh with the platen gear is meshed at a side which is the same as the side where the platen is in contact with the thermal printhead to rotate the platen clockwise and the support member is urged toward the standby position by the spring means.

2. The apparatus of claim 1, wherein said recording and stand-by positions are defined on a surface of said thermal printhead on which said heat-producing elements are provided and said platen roller is brought into pressure contact and said recording and stand-by positions are defined spaced apart from each other in a direction of transportation of said sheet of recording paper between said thermal printhead and said platen roller.

3. A thermal recording apparatus comprising:

a thermal printhead provided with a plurality of heat-producing elements;

a platen roller which is driven to rotate to cause a sheet of recording paper sandwiched between said thermal printhead and said platen roller to be transported;

supporting means for rotatably supporting said platen roller, said supporting means comprising a support member which is movable between first and second positions to locate said platen roller between a stand-by position where said platen roller is located separated away form said heat-producing elements and a recording position where said platen roller is located adjacent to said heat-producing elements; and position control means for controlling the position of said supporting means, said position control means positioning said supporting means at said first position during a non-recording mode and at said second position during a recording mode;

wherein said position control means comprises spring means for selectively biasing said support member toward one of said first and second positions and gear means for selectively urging said support member against said spring biasing toward the other of said first and second positions, and wherein said position control means includes a lock lever formed with a cut-away portion and a pin fixed attached to said support member and in engagement with said cut-away portion of said lock lever, said lock lever being pivotally supported and said cut-away portion having a first engagement portion which is engaged by said pin when said supporting means takes said first position and a second engagement portion which is engaged by said pin when said supporting means takes said second position;

said apparatus further comprising:

drive means for rotating said gear means to cause said selective urging of said support member against said spring biasing, wherein said gear means comprises a platen gear attached to one end of said platen roller, said platen gear begin in mesh with a coupling gear which cooperates with a drive gear.

4. The apparatus of claim 3, wherein said recording and stand-by positions are defined on a surface of said thermal printhead on which said heat-producing elements are provided and said platen roller is brought into pressure contact and said recording and stand-by positions are defined spaced apart from each other in a direction of transportation of said sheet of recording paper between said thermal printhead and said platen roller.

* * * * *